US010263263B2

(12) United States Patent
Kanno et al.

(10) Patent No.: US 10,263,263 B2
(45) Date of Patent: Apr. 16, 2019

(54) FRAME BODY, CELL FRAME FOR REDOX FLOW BATTERY, AND REDOX FLOW BATTERY

(71) Applicant: Sumitomo Electric Industries, Ltd., Osaka-shi (JP)

(72) Inventors: Takashi Kanno, Osaka (JP); Takeshi Yamana, Osaka (JP); Kenji Motoi, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/117,630

(22) PCT Filed: Aug. 20, 2015

(86) PCT No.: PCT/JP2015/073427
§ 371 (c)(1),
(2) Date: Aug. 9, 2016

(87) PCT Pub. No.: WO2016/166904
PCT Pub. Date: Oct. 20, 2016

(65) Prior Publication Data
US 2017/0054161 A1    Feb. 23, 2017

(30) Foreign Application Priority Data
Apr. 14, 2015   (JP) .................. 2015-082781

(51) Int. Cl.
*H01M 8/0273*   (2016.01)
*H01M 8/02*    (2016.01)
(Continued)

(52) U.S. Cl.
CPC .......... *H01M 8/0273* (2013.01); *H01M 8/02* (2013.01); *H01M 8/0202* (2013.01); *H01M 8/18* (2013.01);
(Continued)

(58) Field of Classification Search
None
See application file for complete search history.

(56) References Cited

U.S. PATENT DOCUMENTS

| 2,225,800 A | 12/1940 | Rosenbloom |
| 2,932,681 A | 4/1960 | Solomon |

(Continued)

FOREIGN PATENT DOCUMENTS

| CA | 1153058 A | 8/1983 |
| CN | 2862346 Y | 1/2007 |

(Continued)

OTHER PUBLICATIONS

International Search Report in International Application No. PCT/JP2015/073427, dated Nov. 24, 2015.
(Continued)

*Primary Examiner* — Carmen V Lyles-Irving
(74) *Attorney, Agent, or Firm* — Venable LLP; Tamatane J. Aga; Laura G. Remus

(57) ABSTRACT

There is provided a frame body used for a cell of a redox flow battery, that can improve heat dissipation of an electrolyte in a slit and can suppress rise of the temperature of the electrolyte. It is a frame body used for a cell of a redox flow battery, comprising: an opening formed inside the frame body; a manifold allowing an electrolyte to pass therethrough; and a slit which connects the manifold and the opening and forms a channel of the electrolyte between the manifold and the opening, the slit having a pair of sidewalls facing each other in a cross section orthogonal to a direction in which the electrolyte flows, the slit having, at at least a portion thereof in the slit's depthwise direction, a width narrowing portion allowing the sidewalls to have a spacing narrowed in the depthwise direction.

10 Claims, 6 Drawing Sheets

(51) Int. Cl.
*H01M 8/0202* (2016.01)
*H01M 8/18* (2006.01)
*H01M 8/20* (2006.01)
*H01M 8/2465* (2016.01)
*H01M 4/86* (2006.01)

(52) U.S. Cl.
CPC .............. *H01M 8/188* (2013.01); *H01M 8/20* (2013.01); *H01M 8/2465* (2013.01); *H01M 2004/8694* (2013.01); *Y02E 60/528* (2013.01)

(56) References Cited

U.S. PATENT DOCUMENTS

| | | | |
|---|---|---|---|
| 5,851,694 | A | 12/1998 | Miyabayashi et al. |
| 6,524,452 | B1 | 2/2003 | Clark et al. |
| 2012/0308911 | A1 | 12/2012 | Peled et al. |
| 2013/0037760 | A1* | 2/2013 | Maeda ................ H01M 8/0213 252/511 |
| 2013/0089767 | A1* | 4/2013 | Blacker ................ H01M 8/188 429/105 |
| 2014/0197605 | A1 | 7/2014 | Shimazoe et al. |
| 2014/0255815 | A1 | 9/2014 | Yano et al. |
| 2014/0363748 | A1* | 12/2014 | Kritzer ................ H01M 8/0273 429/409 |

FOREIGN PATENT DOCUMENTS

| | | |
|---|---|---|
| CN | 101814618 A | 8/2010 |
| CN | 102082282 A | 6/2011 |
| CN | 102842730 A | 12/2012 |
| CN | 103035931 A | 4/2013 |
| CN | 103765058 A | 4/2014 |
| JP | 10-012261 A | 1/1998 |
| JP | 2002-246061 A | 8/2002 |
| JP | 2004-335158 A | 11/2004 |
| JP | 2013-080613 A | 5/2013 |
| JP | 2013-518362 A | 5/2013 |

OTHER PUBLICATIONS

Written Opinion of the International Searching Authority in International Application No. PCT/JP2015/073427, dated Nov. 24, 2015.
Patent Examination Report No. 1 in counterpart Austrialian Patent Application No. 2015381015, dated Sep. 2, 2016.
International Search Report in International Application No. PCT/JP2016/058751 dated May 17, 2016.
Written Opinion of the International Searching Authority in International Application No. PCT/JP2016/058751 dated May 17, 2016.
U.S. Appl. No. 15/124,483, filed Sep. 8, 2016.
Extended European Search Report in counterpart European Patent Application No. 15880673.7, dated Feb. 14, 2017.
Notice of Allowance and Allowability in U.S. Appl. No. 15/616,449, dated Jun. 29, 2017 [Related application].
Office Action issued in U.S. Appl. No. 15/124,483, dated Aug. 11, 2017 [Related Application].
Office Action issued in U.S. Appl. No. 15/616,449, dated Oct. 16, 2017 [Related Application].
Office Action issued in U.S. Appl. No. 15/124,483, dated Nov. 15, 2017 [Related Application].
Office Action issued in U.S. Appl. No. 15/616,449, dated Mar. 2, 2018 [Related Application].
Office Action issued in U.S. Appl. No. 15/124,483, dated Mar. 8, 2018 [Related Application].
Office Action dated Jun. 29, 2018 in U.S. Appl. No. 15/616,449 [Related Application].
Notice of Allowance dated Sep. 6, 2018 in U.S. Appl. No. 15/124,483 [Related Application].

* cited by examiner ns to a frame body of a cell for a redox flow battery, that can improve heat dissipation of an electrolyte in a slit provided in the frame body and can suppress rise of the temperature of the electrolyte.

FRAME BODY, CELL FRAME FOR REDOX FLOW BATTERY, AND REDOX FLOW BATTERY

TECHNICAL FIELD

The present invention relates to a frame body used for a cell of a redox flow battery, a cell frame for a redox flow battery, and a redox flow battery. In particular, the present invention relates to a frame body of a cell for a redox flow battery, that can improve heat dissipation of an electrolyte in a slit provided in the frame body and can suppress rise of the temperature of the electrolyte.

BACKGROUND ART

As one large-capacity storage battery, a redox flow battery (hereafter also referred to as an "RF battery") is known (see patent documents 1 and 2). Referred to as applications of the redox flow battery are load leveling, as well as momentary drop compensation and backup power supply, and smoothing an output of natural energy such as solar power generation, wind power generation and the like whose massive introduction is prompted.

An RF battery is a battery which performs charging and discharging using as a positive electrode electrolyte and a negative electrode electrolyte an electrolyte containing a metal ion (an active material) having a valence varying by oxidation-reduction. FIG. 10 shows a principle of an operation of a vanadium-based RF battery 300 which uses as a positive electrode electrolyte and a negative electrode electrolyte a vanadium electrolyte containing a V ion serving as an active material. In FIG. 10 a solid line arrow and a broken line arrow in a battery cell 100 indicate a charging reaction and a discharging reaction, respectively.

RF battery 300 includes cell 100 separated into a positive electrode cell 102 and a negative electrode cell 103 by an ion exchange film 101 which permeates hydrogen ions. Positive electrode cell 102 has a positive electrode 104 incorporated therein, and a tank 106 provided for the positive electrode electrolyte and storing the positive electrode electrolyte is connected via conduits 108, 110 to positive electrode cell 102. Negative electrode cell 103 has a negative electrode 105 incorporated therein, and a tank 107 provided for the negative electrode electrolyte and storing the negative electrode electrolyte is connected via conduits 109, 111 to negative electrode cell 103. And by pumps 112, 113, the electrolyte stored in each tank 106, 107 is circulated and thus passed through cell 100 (positive electrode cell 102 and negative electrode cell 103) to perform charging and discharging.

In RF battery 300, normally, a configuration including a cell stack having a plurality of cells 100 stacked in layers is utilized. FIG. 11 is a schematic configuration diagram of a cell stack. A cell stack 10S illustrated in FIG. 11 is formed such that it is composed of a cell frame 20 including a frame body 22 in the form of a rectangular frame and a bipolar plate 21 provided inside frame body 22, positive electrode 104, ion exchange membrane 101, and negative electrode 105, each stacked in a plurality of layers, and this stack is sandwiched and thus clamped by two end plates 250. Frame body 22 has an opening formed thereinside, and cell frame 20 is configured such that bipolar plate 21 is fitted in the opening of frame body 22. Cell frame 20 has a recess (a chamber) 24 formed inside frame body 22 by an inner peripheral surface of frame body 22 and a surface of bipolar plate 21, and positive electrode 104 is disposed at one surface side of bipolar plate 21 and negative electrode 105 is disposed at the other surface side of bipolar plate 21. In chamber 24 formed inside frame body 22, electrodes (positive electrode 104 or negative electrode 105) are accommodated, and an internal space of chamber 24 surrounded by bipolar plate 21, frame body 22, and ion exchange membrane 101 configures a cell (a positive electrode cell or a negative electrode cell). In the above cell stack 10S, as shown in FIG. 11, a single cell (a unit cell) 100 will be formed by disposing a pair of positive and negative electrodes 104, 105 between adjacent cell frames 20 with ion exchange membrane 101 interposed between the electrodes.

In cell stack 10S, an electrolyte is passed by a manifold 200 formed in and penetrating frame body 22, and a slit 210 formed on a surface of frame body 22 and providing connection between manifold 200 and chamber 24. In cell stack 10S illustrated in FIG. 11, the positive electrode electrolyte is supplied from a liquid supply manifold 201 via a liquid supply slit 211 that is formed in one surface side (corresponding to the front side of the sheet of the drawing) of frame body 22 to chamber 24 having positive electrode 104 accommodated therein, passes through chamber 24, and is drained via a liquid drainage slit 213 to a liquid drainage manifold 203. Similarly, the negative electrode electrolyte is supplied from a liquid supply manifold 202 via a liquid supply slit 212 that is formed in the other surface side (corresponding to the back side of the sheet of the drawing) of frame body 22 to the chamber having negative electrode 105 accommodated therein, and is drained via a liquid drainage slit 214 to a liquid drainage manifold 204. Between cell frames 20, in order to suppress leakage of the electrolyte, a looped seal member 50, such as an O ring and a flat gasket, is disposed along an outer perimeter of frame body 22.

CITATION LIST

Patent Documents

PTD 1: Japanese Patent Laying-Open No. 2013-080613
PTD 2: Japanese Patent Laying-Open No. 2002-246061

SUMMARY OF INVENTION

Technical Problem

In the RF battery, when the slit is filled with an electrolyte in a charged state, a shunt current flows via the electrolyte in the slit, and a loss by the shunt current (a shunt current loss) is caused. This shunt current may result in the electrolyte generating heat and having an increased temperature. For example, when the RF battery stands by, the electrolyte stays in the slit, and accordingly, the temperature of the electrolyte within the slit increases more easily than in an operation when the electrolyte is passed. When the temperature of the electrolyte is increased, a precipitate may be produced in the electrolyte and there is a possibility of inviting reduction in battery performance such as degradation of the electrolyte. Furthermore, when the temperature of the electrolyte is increased, its heat may soften and deform the frame body and thus damage the frame body (or the cell frame). Accordingly, in order to suppress rise of the temperature of the electrolyte in the slit, there is a demand for improved heat dissipation of the electrolyte.

A frame body used for a cell of an RF battery as conventional generally has a slit having a substantially square cross section. Conventionally, there has not been a sufficient consideration done for a slit's cross section in view of improving heat dissipation of the electrolyte in the slit.

The present invention has been made in view of the above circumstances, and one object of the present invention is to provide a frame body of a cell for a redox flow battery, that can improve heat dissipation of an electrolyte in a slit and can suppress rise of the temperature of the electrolyte.

Solution to Problem

A frame body according to one aspect of the present invention is a frame body used for a cell of a redox flow battery, comprising: an opening formed inside the frame body; a manifold through which an electrolyte circulates; and a slit connected between the opening and the manifold, the slit forming a channel for the electrolyte between the opening and the manifold. The slit has a pair of sidewalls which are oppositely disposed in a cross section orthogonal to a direction in which the electrolyte circulates, and the slit has, in a portion along a depthwise direction of the slit, a width narrowing portion at which a space between the sidewalls narrows along the depthwise direction of the slit.

A cell frame for a redox flow battery according to one aspect of the present invention comprises: a frame body according to one aspect of the present invention as described above; and a bipolar plate fitted in the opening of the frame body, the frame body and the bipolar plate forming a chamber inside the frame body.

A redox flow battery according to one aspect of the present invention comprises a cell frame for a redox flow battery according to one aspect of the present invention as described above.

Advantageous Effect of Invention

The above frame body can improve heat dissipation of an electrolyte in a slit and can suppress rise of the temperature of the electrolyte. The above cell frame for a redox flow battery, and the redox flow battery can improve heat dissipation of an electrolyte in a slit provided in a frame body configuring a cell and can suppress rise of the temperature of the electrolyte.

DESCRIPTION OF EMBODIMENTS

Figure 1:
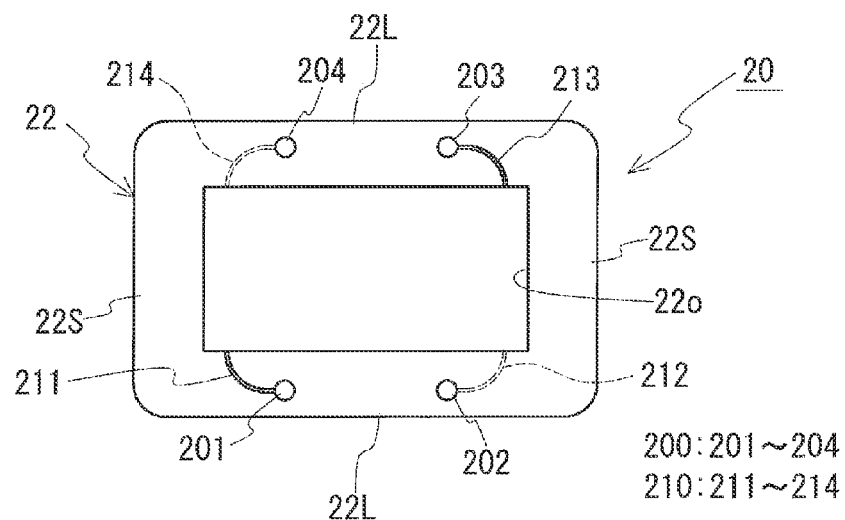
FIG. 1 is a schematic front view of a frame body according to a first embodiment.

Description of Embodiments of the Present Invention

In order to suppress precipitation of an electrolyte component in a slit provided in a frame body, the present inventors have examined a cross sectional shape of a slit that can improve heat dissipation of an electrolyte in the slit to suppress rise of the temperature of the electrolyte. "A cross sectional shape of a slit" means a shape of a cross section orthogonal to a direction in which an electrolyte flows, and is represented in that cross section as a closed region surrounded by a wall surface and an opening portion configuring the slit. In the following description, unless otherwise specified, "a cross section of a slit" means a cross section orthogonal to a direction in which an electrolyte flows.

When a shunt current causes heat generation and the temperature of the electrolyte in the slit has increased, the electrolyte's heat is dissipated from a wall surface of the slit which the electrolyte contacts, and thus cooled. Accordingly, in the slit at a portion in contact with the wall surface of the slit, heat conduction decreases the electrolyte's temperature and a difference in temperature causes a convection current of the electrolyte. If this convection current can be promoted, it is believed that heat transfer from the electrolyte to the slit's wall surface is promoted, and the electrolyte's heat dissipation efficiency is improved. Accordingly, the present inventors have studied a variety of types of cross sectional shapes of a slit which can promote a convection current of an electrolyte.

A cross sectional shape of a conventional slit as conventional is substantially a square, as has been described above, and it is a shape which has a bottom wall parallel to a surface of a frame body and a pair of sidewalls extending from the surface of the frame body to the bottom wall in a vertical direction and facing each other in parallel. That is, the conventional slit has sidewalls spaced from each other substantially uniformly throughout the entirety of the slit's depthwise direction, and the sidewall and the bottom wall form a right angle (90 degrees). The "slit's depthwise direction" means, as seen in a cross section orthogonal to a direction in which an electrolyte flows, a direction perpendicular to the surface of the frame body from the opening portion of the slit toward the bottom thereof (that is, the frame body's thickness direction).

To promote a convection current of an electrolyte, the present inventors have considered providing a slit having a cross sectional shape having a width narrowing portion allowing the sidewalls to have a spacing narrowed in the depthwise direction. This slit, in the width narrowing portion, has at least one of the sidewalls inclined relative to the depthwise direction, and it is believed that when a convection current is caused in the electrolyte in the slit, a convection current of the electrolyte which moves along the sidewall is promoted. Accordingly, the slit having such a cross sectional shape promotes the convection current of the electrolyte as compared with the conventional slit having sidewalls parallel to each other and also parallel to the depthwise direction and it is thus believed that it can improve heat dissipation of the electrolyte and hence suppress rise of the temperature of the electrolyte.

The present inventors have completed the present invention based on the above idea. Initially, embodiments of the present invention will be enumerated and described.

(1) A frame body according to one aspect of the present invention is a frame body used for a cell of a redox flow battery, comprising: an opening formed inside the frame body; a manifold through which an electrolyte circulates; and a slit connected between the opening and the manifold, the slit forming a channel for the electrolyte between the opening and the manifold. The slit has a pair of sidewalls which are oppositely disposed in a cross section orthogonal to a direction in which the electrolyte circulates, and the slit has, in a portion along a depthwise direction of the slit, a width narrowing portion at which a space between the sidewalls narrows along the depthwise direction of the slit.

According to the above frame body, the slit, as seen in a cross section, has, at at least a portion thereof in its depthwise direction, a width narrowing portion allowing the sidewalls to have a spacing narrowed in the depthwise direction, and a convection current of the electrolyte is promoted. Specifically, in the width narrowing portion, at least one of the sidewalls is inclined relative to the depthwise direction, and a convection current of the electrolyte which moves along the sidewall's inclined surface can be promoted. As a result, a heat dissipation effect of the electrolyte by the convection current is improved. Thus, heat dissipation of the electrolyte in the slit can be better and rise of the temperature of the electrolyte can be suppressed more, and hence precipitation of an electrolyte component can be suppressed more than conventional. Furthermore, softening and deformation of the frame body by the effect of the heat of the electrolyte can be suppressed.

The "width narrowing portion" is a portion at which sidewalls have a spacing continuously varying to be gradually narrowed in the slit's depthwise direction (from the opening portion's side to the bottom's side). In the width narrowing portion, at least one of the sidewalls inclined relative to the depthwise direction suffices, and one sidewall may be inclined relative to the depthwise direction and the other sidewall may be along the depthwise direction or both sidewalls may be inclined relative to the depthwise direction. Being "along the depthwise direction" means being substantially parallel relative to the depthwise direction (i.e., being perpendicular to the surface of the frame body from the opening portion's side toward the bottom's side). Furthermore, the width narrowing portion is only required to be provided at at least a portion of the slit in the slit's depthwise direction, and the width narrowing portion may be formed at a portion in the depthwise direction and the other portion(s) may have the sidewalls spaced substantially uniformly. For example, there may be a portion which has sidewalls spaced substantially uniformly in a region from the opening portion to an intermediate location in the depthwise direction and thus has the same width as the opening portion. Only a single width narrowing portion may be provided or a plurality of width narrowing portions may be provided. Preferably, the width narrowing portion is formed throughout the entirety of the depthwise direction.

(2) As one aspect of the above frame body, the above slit has a bottom wall and the bottom wall has a flat surface parallel to the surface of the above frame body.

According to the above aspect, as the bottom wall has a flat surface parallel to the surface of the frame body, the slit can have a perimeter longer than a conventional slit having a square cross-sectional shape having the same cross-sectional area as the inventive slit. When the slit has a longer perimeter, the slit will contact the electrolyte over an accordingly increased area and heat transfer to the slit's wall surface from the electrolyte accordingly increases, and a heat dissipation effect of the electrolyte by heat conduction improves. This can further improve heat dissipation of the electrolyte in the slit and can further suppress rise of the temperature of the electrolyte. A "perimeter of the slit" means the perimeter in a cross section orthogonal to a direction in which the electrolyte flows, and is represented as a total of a perimeter of a wall surface configuring the slit (an overall length of the sidewalls and the bottom wall) and a width of the opening portion in that cross section.

(3) As one aspect of the frame body described in the above item (2), at least one of the above sidewalls and the above bottom wall form an angle of 91 degrees or more and 120 degrees or less.

When a sidewall and a bottom wall form a right angle (90 degrees), as a conventional slit having a square cross-sectional shape has, a convection current along a corner formed by the sidewall and the bottom wall is difficult to arise, and it is difficult to promote heat dissipation of the electrolyte by the convection current near the corner. When the sidewall and the bottom wall form an angle of 91 degrees or more, the electrolyte is easily convected at the corner of the sidewall and the bottom wall along an inclined surface of the sidewall, and heat dissipation of the electrolyte near the corner is thus promoted. When the sidewall and the bottom wall form an angle of 120 degrees or less, for a fixed cross-section area of the slit, the slit does not have an excessively long perimeter, and an excessive increase of pressure loss when the electrolyte passes can be suppressed. The larger the slit's cross-sectional area is, or the shorter the slit's perimeter is, the smaller a pressure loss is, and for a given cross-sectional area, a shorter perimeter allows a smaller pressure loss. When the sidewall and the bottom wall form an angle of 120 degrees or less, the slit's depth is not excessively shallow and the slit is easily formed. The slit is for example formed simultaneously with forming the frame body by injection molding or formed by cutting. Furthermore, when the sidewall and the bottom wall form an angle of 120 degrees or less, the slit has an opening portion with a width which is not excessively large, and the frame body can be reduced in width and thus miniaturized. Preferably, the sidewall and the bottom wall form an angle for example of 95 degrees or more and 110 degrees or less.

(4) As one aspect of the frame body described in the above item (2) or (3), at least one of the above sidewalls and the above bottom wall form a corner having a curved surface.

When the sidewalls and the bottom wall form a corner having a curved surface, the electrolyte is easily convected along the corner, and heat dissipation of the electrolyte near the corner is thus promoted. For example the corner has a radius of curvature of 0.1 mm or more and 10 mm or less, and furthermore, 0.2 mm or more and 5.0 mm or less.

(5) As one aspect of the above frame body, in the above width narrowing portion, at least one of the sidewalls has an inclined surface which inclines relative to the depthwise direction, and the above inclined surface is a flat surface.

As the width narrowing portion has a sidewall having a flat inclined surface, the slit is easily formed with precision when it is formed by cutting or the like.

(6) As one aspect of the above frame body, in the above width narrowing portion, at least one of the sidewalls has an inclined surface which inclines relative to the depthwise direction, and the above inclined surface is a curved surface.

As the width narrowing portion has a sidewall having a curved inclined surface, a convection current of the electrolyte which moves along the inclined surface is more easily promoted and heat dissipation efficiency of the electrolyte by the convection current is further improved.

(7) As one aspect of the above frame body, the above slit has a bottom wall and the bottom wall has a curved surface projecting in the slit's depthwise direction.

According to the above aspect, the bottom wall has a curved surface projecting in the slit's depthwise direction, and the electrolyte is thus easily convected along the curved surface of the bottom wall and heat dissipation of the electrolyte near the bottom wall is thus promoted.

(8) As one aspect of the frame body described in the above item (7), an overall surface of the above sidewalls and the above bottom wall is formed in a curved surface.

As an overall surface of the sidewalls and the bottom wall is formed in a curved surface, i.e., the slit has a wall surface entirely formed in a curved surface, the electrolyte is easily convected along the slit's wall surface (the sidewalls and the bottom wall) and heat dissipation efficiency of the electrolyte by the convection current is further improved.

(9) As one aspect of the above frame body, a spacing between the above sidewalls at any position in the above slit's depthwise direction is equivalent to or less than a spacing between the sidewalls closer to the opening portion's side than that position.

According to the above aspect, the sidewalls have a spacing being equal to or smaller than a width of the opening portion throughout the entirety of the slit's depthwise direction and also being the widest at the opening portion and the narrowest at the bottom. As the sidewalls have a spacing narrowed from the opening portion toward the bottom and there is no portion widened at an intermediate portion in the depthwise direction, which facilitates forming the slit. For example, a spacing between the sidewalls at a position at a half of the depth of the slit from the bottom is narrower than the opening portion, or a spacing between the sidewalls at a portion closer to the bottom's side than a position at one fourth of the depth of the slit from the bottom is gradually narrowed.

(10) A cell frame for a redox flow battery according to one aspect of the present invention comprises: the frame body according to any one of items (1) to (9); and a bipolar plate fitted in the opening of the frame body, the frame body and the bipolar plate forming a chamber inside the frame body.

According to the above cell frame, as the above frame body according to one aspect of the present invention is included, in a frame body configuring a cell of a redox flow battery, heat dissipation of an electrolyte in a slit can be improved and rise of the temperature of the electrolyte can be suppressed. Thus, precipitation of an electrolyte component can be suppressed and softening and deformation of the frame body by the effect of the heat of the electrolyte can be suppressed.

(11) A redox flow battery according to one aspect of the present invention comprises a cell frame for a redox flow battery according to the above item (10).

According to the above redox flow battery, as the above cell frame according to one aspect of the present invention is included, in a frame body configuring a cell, heat dissipation of an electrolyte in a slit can be improved and rise of the temperature of the electrolyte can be suppressed. Thus, precipitation of an electrolyte component can be suppressed and softening and deformation of the frame body by the effect of the heat of the electrolyte can be suppressed.

Detailed Description of Embodiments of the Present Invention

A specific example of a frame body and a cell frame for a redox flow battery according to an embodiment of the present invention will now be described hereafter with reference to the drawings. In the figures, identical reference characters denote identical or corresponding components. Note that the present invention is not limited to these examples, and is intended to include any modifications within the meaning and scope indicated by and equivalent to the terms of the claims.

First Embodiment

<Frame Body>

Figure 2:
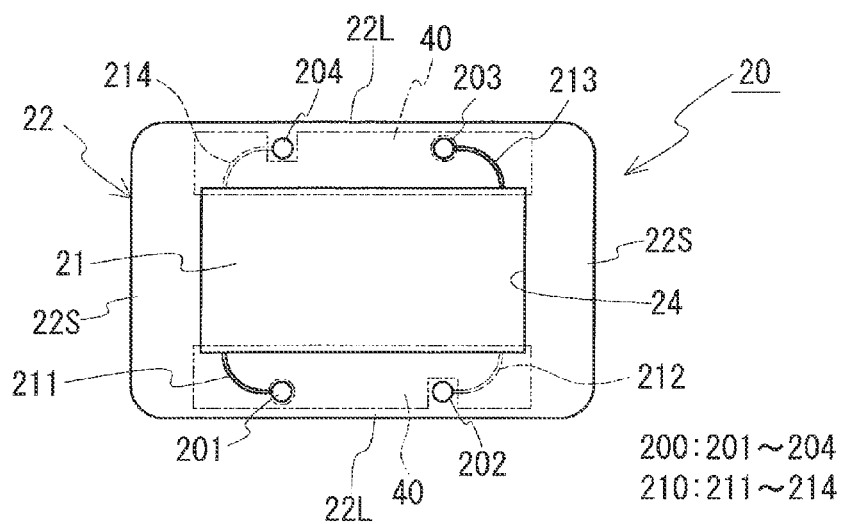
FIG. 2 is a schematic front view of a cell frame including the frame body according to the first embodiment.
Figure 3:
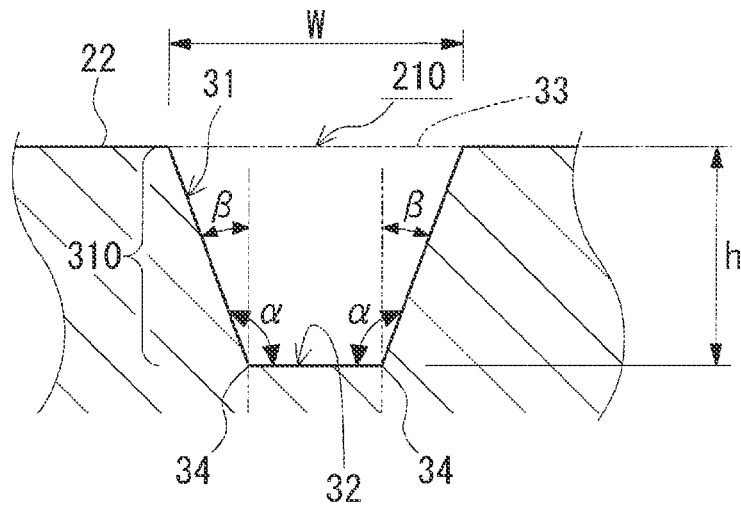
FIG. 3 is a schematic cross section showing a cross sectional shape of a slit in the frame body according to the first embodiment.

With reference to FIG. 1 to FIG. 3, a frame body and a cell frame according to a first embodiment will be described. FIG. 1 illustrates a frame body 22 which is in the form of a rectangular frame having a pair of long pieces 22L opposite to each other and a pair of short pieces 22S which connect the ends of long pieces 22L, and an opening 22o is formed inside the frame body. A bipolar plate 21 which will be described later is fitted in this opening 22o. Frame body 22 is formed for example of vinyl chloride resin, polypropylene, polyethylene, fluoro-resin, epoxy resin or other similar plastics or rubbers, or the like.

Frame body 22 includes a manifold 200 (manifolds 201-204) which penetrates the front and back sides of the frame body and passes an electrolyte, and a slit 210 (slits 211-214) which is formed on a surface of the frame body and forms a channel between manifold 200 and opening 22o for the electrolyte. Manifold 200 and slit 210 can for example be formed simultaneously with forming frame body 22 by injection molding.

(Manifold and Slit)

Manifolds 201, 202 are formed in frame body 22 at one long piece 22L (in FIG. 1, a lower long piece), and manifolds 203, 204 are formed in frame body 22 at the other long piece 22L (in FIG. 1, an upper long piece). Slits 211, 213 are formed on frame body 22 at one surface side and slits 212, 214 are formed on frame body 22 at the other surface side. Slits 211-214 have their respective one ends connected to manifolds 201-204, respectively, and the other ends connected to opening 22o, and slits 211-214 connect manifolds 201-204, respectively, and opening 22o formed inside frame body 22.

<Cell Frame>

Figure 11:
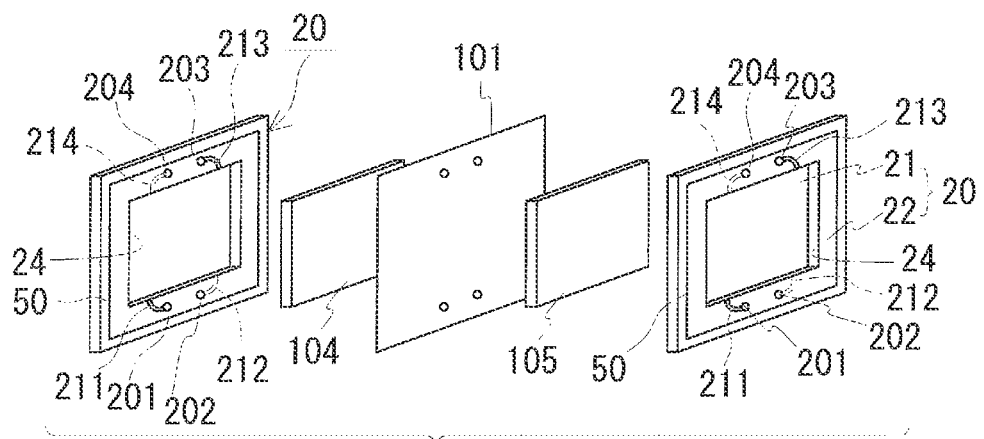
FIG. 11 is a schematic configuration diagram of a cell stack.
Figure 11:
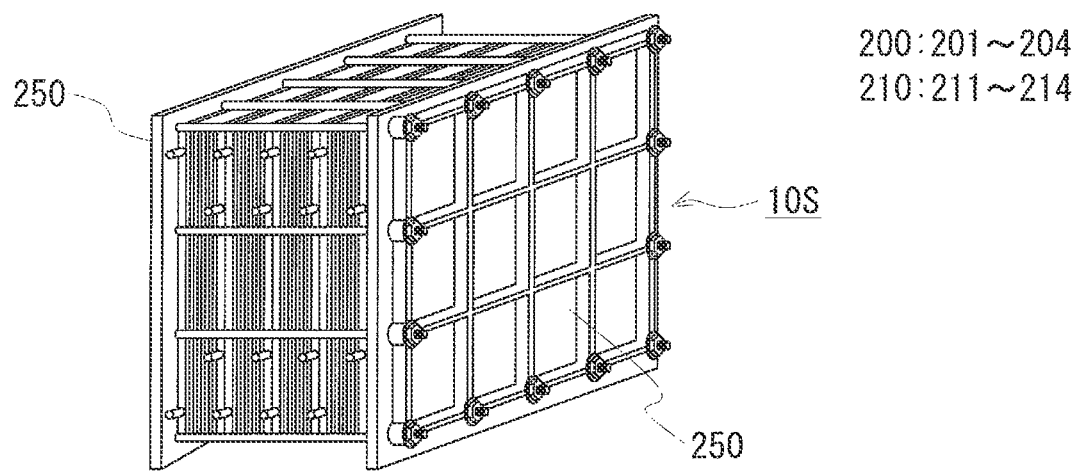

With reference to FIG. 2, a cell frame including the frame body according to the first embodiment shown in FIG. 1 will be described. A cell frame 20 illustrated in FIG. 2 includes frame body 22 and bipolar plate 21 fitted in opening 22o (see FIG. 1) of frame body 22. Cell frame 20 has frame body 22 formed to sandwich a peripheral edge portion of bipolar plate 21 from the front and back sides and frame body 22 is integrated with an outer periphery of bipolar plate 21 by injection molding or the like. By fitting bipolar plate 21 in opening 22o of frame body 22, a recess (a chamber 24) is formed by frame body 22 and bipolar plate 21. Specifically, cell frame 20 has chamber 24 formed inside frame body 22 by an inner peripheral surface of frame body 22 and a surface of bipolar plate 21 to accommodate an electrode (not shown). In FIG. 2, only chamber 24 on one surface side (the front side of the sheet of the figure) of cell frame 20 is shown, however, a chamber is also formed on the other surface side (the back side of the sheet of the figure) of cell frame 20. A positive electrode is accommodated in the chamber on one surface side of cell frame 20 and a negative electrode is accommodated in the chamber on the other surface side of cell frame 20, and the positive electrode is disposed on one surface side of bipolar plate 21 and the negative electrode is disposed on the other surface side of bipolar plate 21 (see FIG. 11). Bipolar plate 21 can be formed of plastic carbon.

For cell frame 20 (frame body 22) illustrated in FIG. 2, manifolds 201 and 203 are a liquid supply manifold and a liquid drainage manifold for a positive electrode electrolyte, and slits 211 and 213 are a liquid supply slit and a liquid drainage slit for the positive electrode electrolyte. Manifolds 202 and 204 are a liquid supply manifold and a liquid drainage manifold for a negative electrode electrolyte, and slits 212 and 214 are a liquid supply slit and a liquid drainage slit for the negative electrode electrolyte. Liquid supply slits 211, 212 extending from liquid supply manifolds 201, 202 are connected to a lower edge portion of chamber 24 (opening 22o (see FIG. 1)), and liquid drainage slits 213, 214 extending from liquid drainage manifolds 203, 204 are connected to an upper edge portion of chamber 24 (opening 22o). That is, the electrolyte is introduced into chamber 24 from a lower side of chamber 24, and the electrolyte is drained from an upper side of chamber 24. A flow adjustment portion (not shown) is formed at the lower and upper edge portions of chamber 24 therealong. The flow adjustment portion has a function which diffuses the electrolyte introduced from liquid supply slits 211, 212, along the lower edge portion of chamber 24, and collects the electrolyte drained from the upper edge portion of chamber 24, to liquid drainage slits 213, 214. By this flow adjustment portion, the electrolyte passes from the lower edge portion of chamber 24 through the interior of chamber 24 toward the upper edge portion of chamber 24.

The positive and negative electrolytes can be a known electrolyte. For example, referred to as the positive and negative electrolytes are a V based electrolyte which contains V ion as an active material for the positive electrode and the negative electrode, a combination of an Fe/Cr based electrolyte which contains Fe ion as a positive electrode active material and Cr ion as a negative electrode active material, a Ti/Mn based electrolyte which contains Mn ion as a positive electrode active material and Ti ion as a negative electrode active material, and the like.

(Protective Plate)

On cell frame 20, at a portion of frame body 22 where slits 211-214 are formed, a protective plate 40 made of plastic and protecting an ion exchange membrane (see FIG. 11) may be disposed. Protective plate 40 is disposed on a surface of long piece 22L of frame body 22 to cover each slit 211-214, and each protective plate 40 has a throughhole or a notch formed at a position corresponding to each manifold 201-204. In the case of protective plate 40 illustrated in FIG. 2, for protective plate 40 disposed at one surface side of frame body 22 at which slits 211, 213 for the positive electrode electrolyte are formed, a circular throughhole is formed for manifolds 201, 203 for the positive electrode electrolyte, whereas a rectangular notch is formed for manifolds 202, 204 for the negative electrode electrolyte. In contrast, for protective plate 40 disposed at the other surface side of frame body 22 at which slits 212, 214 for the negative electrode electrolyte are formed, a rectangular notch is formed for manifolds 201, 203 for the positive electrode electrolyte, whereas a circular throughhole is formed for manifolds 202, 204 for the negative electrode electrolyte. By this protective plate 40, when a cell of a redox flow battery (see FIG. 11) is configured using cell frame 20, each slit 211-214 does not contact the ion exchange membrane, and the ion exchange membrane can be prevented from being damaged by the irregularity of the slit. In FIG. 2, only protective plate 40 which covers slits 211, 213 formed at one surface side of frame body 22 is shown, however, there is also a protective plate disposed at the other surface side of frame body 22 to cover slits 212, 214.

(Cross Sectional Shape of Slit)

FIG. 3 shows a cross sectional shape of slit 210 on the frame body (or cell frame) according to the first embodiment. Slit 210 has a pair of sidewalls 31 facing each other in a cross section orthogonal to a direction in which the electrolyte flows, and slit 210 has, at at least a portion thereof in its depthwise direction, a width narrowing portion 310 allowing sidewalls 31 to have a spacing narrowed in the depthwise direction. Hereinafter, a cross sectional shape of slit 210 of the first embodiment will more specifically be described.

Slit 210 of the first embodiment has a bottom wall 32 which connects the pair of sidewalls 31 at their lower ends (or the bottom's side). Bottom wall 32 has a flat surface parallel to a surface of frame body 22. The pair of sidewalls 31 are inclined relative to the depthwise direction and have a spacing gradually narrowed in the depthwise direction (from an opening portion 33 to bottom wall 32). Each sidewall 31 has an entire surface inclined from opening portion 33 to bottom wall 32, and the inclined surface is a flat surface. Sidewalls 31 (or the inclined surfaces) relative to the depthwise direction have substantially equal inclination angles β. Accordingly, slit 210 of the first embodiment has width narrowing portion 310 formed throughout the entirety of the depthwise direction, and has a cross sectional shape in the form of a trapezoid (more specifically, an isogonal trapezoid) with opening portion 33 serving as a longer side and bottom wall 32 serving as a shorter side.

This slit 210 is such that a spacing between sidewalls 31 at any position in the depthwise direction is equivalent to or less than a spacing between sidewalls 31 closer to opening portion 33 than that position. In other words, sidewalls 31 have a spacing being equal to or smaller than a width of opening portion 33 throughout the entirety of the depthwise direction and also being the widest at opening portion 33 and the narrowest at bottom wall 32.

In slit 210, sidewall 31 and bottom wall 32 form an angle α of more than 90 degrees and less than 180 degrees, for example 91 degrees or more and 120 degrees or less, preferably 95 degrees or more and 110 degrees or less. Inclination angle β of sidewall 31 (the inclined surface) relative to the depthwise direction is for example 1 degrees or more and 45 degrees or less, and furthermore, 30 degrees or less, preferably 5 degrees or more and 20 degrees or less. Opening portion 33 has width w for example of 0.1 mm or more, in particular 0.5 mm or more and 20 mm or less, furthermore, 1.0 mm or more and 8.0 mm or less. A depth h (a length in the depthwise direction from opening portion 33 to bottom wall 32) is for example 0.1 mm or more, in particular 0.5 mm or more and 10 mm or less, and furthermore, 1.0 mm or more and 5.0 mm or less.

(Function and Effect)

Frame body 22 (cell frame 20) according to the first embodiment has width narrowing portion 310 at at least a portion of slit 210 in its depthwise direction, and can promote a convection current of the electrolyte which moves along the inclined surface of sidewall 31. As heat dissipation efficiency of the electrolyte by the convection current improves, and heat dissipation of the electrolyte in the slit can be improved and rise of the temperature of the electrolyte can be suppressed. As a consequence, precipitation of an electrolyte component can be suppressed. In particular, sidewall 31 is inclined relative to the depthwise direction and has the entire surface inclined and width narrowing portion 310 formed throughout the entirety of the depthwise direction, so that the electrolyte is easily convected along sidewall 31 and a high effect of heat dissipation of the electrolyte by the convection current is achieved. Furthermore, as angle α formed by sidewall 31 and bottom wall 32 is 91 degrees or more 120 degrees or less, the electrolyte is easily convected at corner 34 along the inclined surface of sidewall 31, and heat dissipation from the electrolyte near corner 34 can thus be promoted.

Slit 210 of the first embodiment has a cross sectional shape in the form of a trapezoid (more specifically, an isogonal trapezoid) and can have a perimeter longer than a conventional slit having a square cross-sectional shape having the same cross-sectional area. Accordingly, the slit contacts the electrolyte over an increased area and heat dissipation efficiency of the electrolyte by heat conduction improves.

Furthermore, as sidewalls 31 have a spacing narrowed from opening portion 33 toward bottom wall 32, there is no portion widened at an intermediate portion in the depthwise direction, which facilitates forming slit 210.

Exemplary Variation

In the first embodiment, slit 210 has an isogonal trapezoidal cross sectional shape, and a pair of sidewalls 31 configuring width narrowing portion 310 are mutually inclined relative to the depthwise direction and have a spacing gradually narrowed in the depthwise direction. As an exemplary variation of the first embodiment, the pair of sidewalls 31 may have one sidewall 31 inclined relative to the depthwise direction and the other sidewall 31 being along the depthwise direction. Furthermore, each sidewall 31 has different inclination angle β.

Then, based on FIG. 4 to FIG. 7, other examples of slit 210 in cross section will be described. Hereinafter, slit 210 will be described such that a configuration similar to the above described first embodiment is identically denoted and will not be described and a point different from the first embodiment will mainly be described.

Second Embodiment

Figure 4:
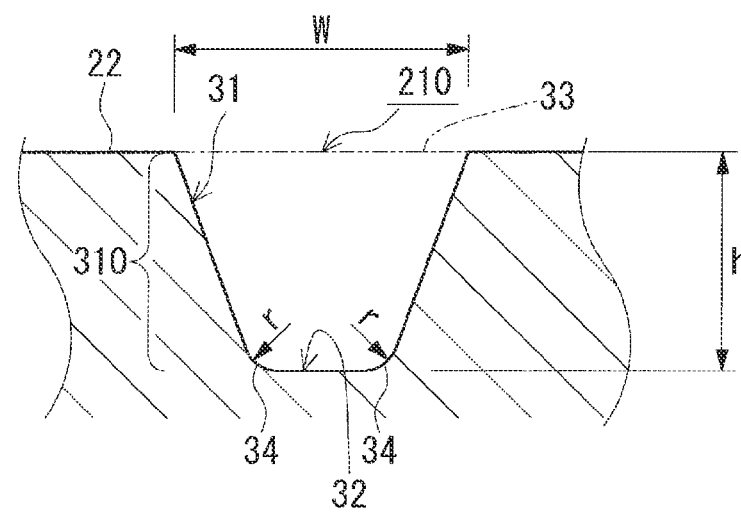
FIG. 4 is a schematic cross section showing a cross sectional shape of a slit in a frame body according to a second embodiment.

FIG. 4 shows a second embodiment, which provides sidewalls 31 and bottom wall 32 forming a corner 34 having a curved surface.

As slit 210 of the second embodiment has corner 34 formed in a curved surface, the electrolyte is easily convected along corner 34, and heat dissipation of the electrolyte near corner 34 is thus promoted. Corner 34 has a radius of curvature r for example of 0.1 mm or more and 10 mm or less, and furthermore, 0.2 mm or more and 5.0 mm or less.

Third Embodiment

Figure 5:
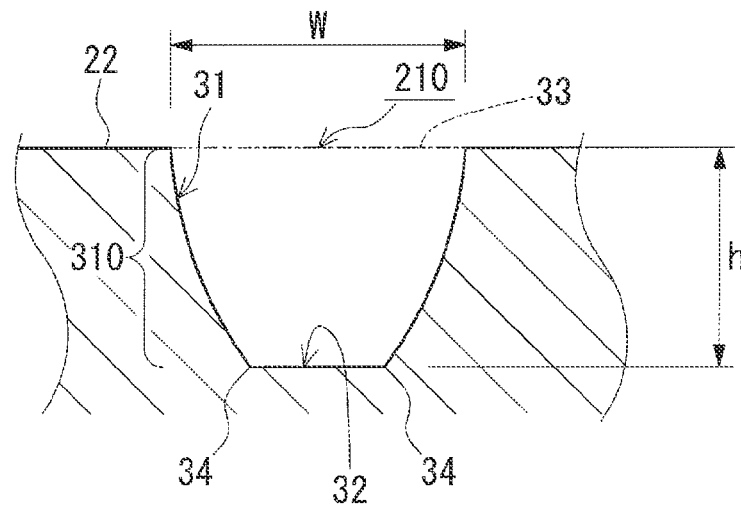
FIG. 5 is a schematic cross section showing a cross sectional shape of a slit in a frame body according to a third embodiment.

FIG. 5 shows a third embodiment, in which width narrowing portion 310 is composed of sidewall 31 having an inclined surface which is a curved surface.

As slit 210 of the third embodiment has sidewall 31 having an inclined surface which is a curved surface, a convection current of the electrolyte which moves along the inclined surface can further be promoted and heat dissipation efficiency of the electrolyte by the convection current is further improved. The curved surface is provided for example in the form of an arc, an elliptical arc, or the like.

Fourth Embodiment

Figure 6:
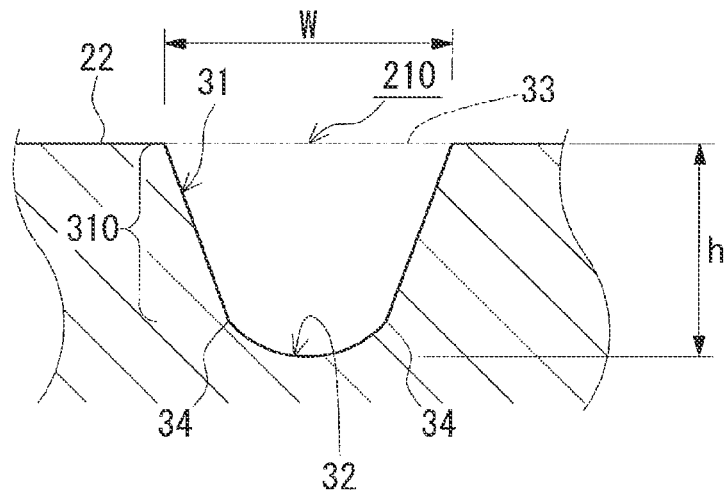
FIG. 6 is a schematic cross section showing a cross sectional shape of a slit in a frame body according to a fourth embodiment.

FIG. 6 shows a fourth embodiment, in which bottom wall 32 has a curved surface projecting in the depthwise direction.

As slit 210 of the fourth embodiment has bottom wall 32 having a curved surface, the electrolyte is easily convected along the curved surface of bottom wall 32 and heat dissipation of the electrolyte near bottom wall 32 is thus promoted.

Fifth Embodiment

Figure 7:
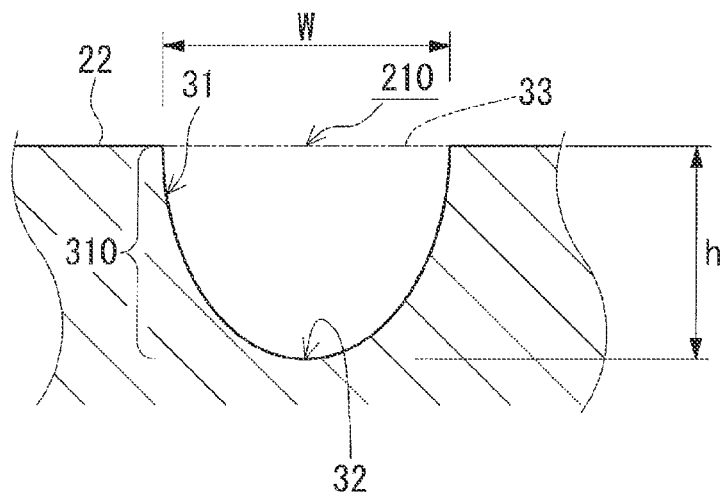
FIG. 7 is a schematic cross section showing a cross sectional shape of a slit in a frame body according to a fifth embodiment.

FIG. 7 shows a fifth embodiment, in which the overall surface of sidewalls 31 and bottom wall 32 is formed in a curved surface.

As the overall surface of sidewalls 31 and bottom wall 32 is formed in a curved surface, i.e., the slit 210 has a wall surface entirely formed in a curved surface, so that the electrolyte is easily convected along the wall surface (sidewalls 31 and bottom wall 32) and heat dissipation efficiency of the electrolyte by the convection current is further improved. Slit 210 has a cross sectional shape for example in a semi-circle, a semi-ellipse or the like, and slit 210 shown in FIG. 7 is semi-elliptical.

(Others)

While in the above described embodiments is described an aspect which has bottom wall 32, an aspect which does not have a bottom wall may be applicable, e.g., the slit may have a cross sectional shape in the form of a triangle with a bottom serving as a vertex and opening portion 33 serving as a base (as a specific example, an isosceles triangle).

Figure 8A:
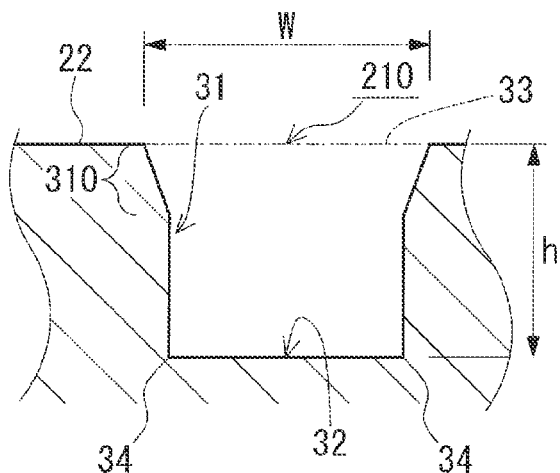
FIG. 8(a) is a schematic cross section showing a cross sectional shape of a slit in an exemplary variation.
Figure 8B:
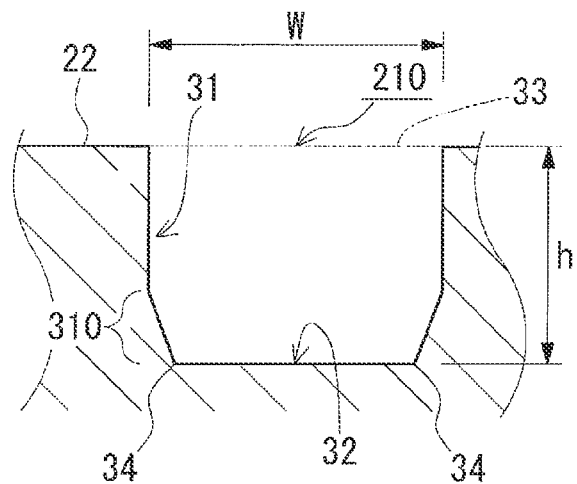
FIG. 8(b) is a schematic cross section showing a cross sectional shape of a slit in another exemplary variation.
Figure 8C:
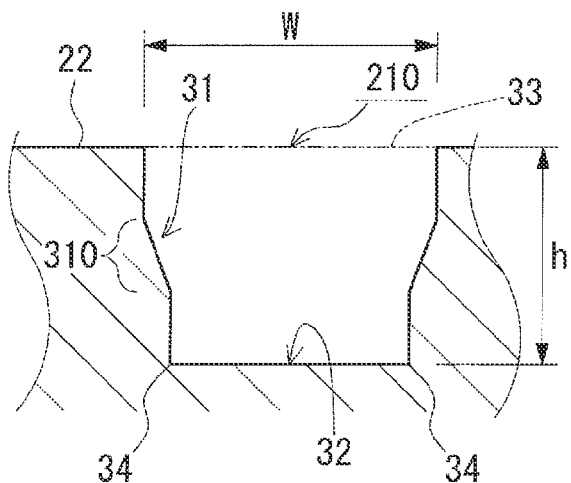
FIG. 8(c) is a schematic cross section showing a cross sectional shape of a slit in still another exemplary variation.

While in the above embodiment an aspect has been described which has sidewall 31 having the entire surface inclined and thus has width narrowing portion 310 throughout the entirety of the depthwise direction, sidewall 31 may partially have an inclined surface, and a portion in the depthwise direction may be provided with width narrowing portion 310 and the other portion(s) may have sidewalls 31 spaced substantially uniformly. For example, as shown in FIG. 8(a), sidewall 31 has an upper end (a side closer to opening portion 33) inclined and width narrowing portion 310 is provided closer to opening portion 33, and as shown in FIG. 8(b), sidewall 31 has a lower end (a side closer to bottom wall 32) inclined and width narrowing portion 310 is provided closer to bottom wall 32. In the case of FIG. 8(a), a spacing of sidewalls 31 is fixed at a portion closer to bottom wall 32 than width narrowing portion 310, and in the case of FIG. 8(b), a portion from opening portion 33 to width narrowing portion 310 has sidewalls 31 having a spacing therebetween equivalent to a width of opening portion 33. Furthermore, as shown in FIG. 8(c), sidewall 31 may have a center inclined and width narrowing portion 310 may be formed at an intermediate portion in the depthwise direction.

Figure 9:
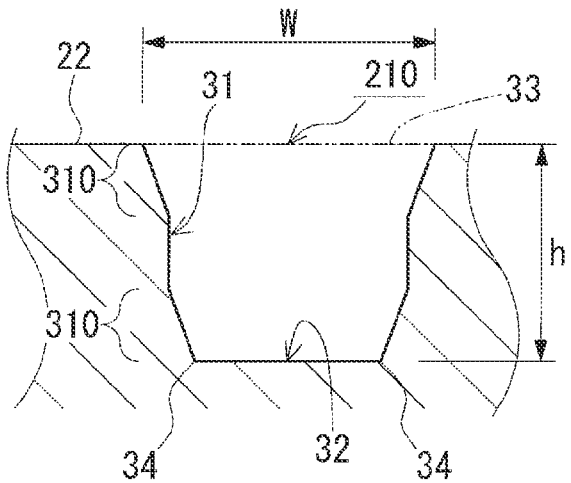
FIG. 9 is a schematic cross section showing a cross sectional shape of a slit in another exemplary variation.
Figure 10:
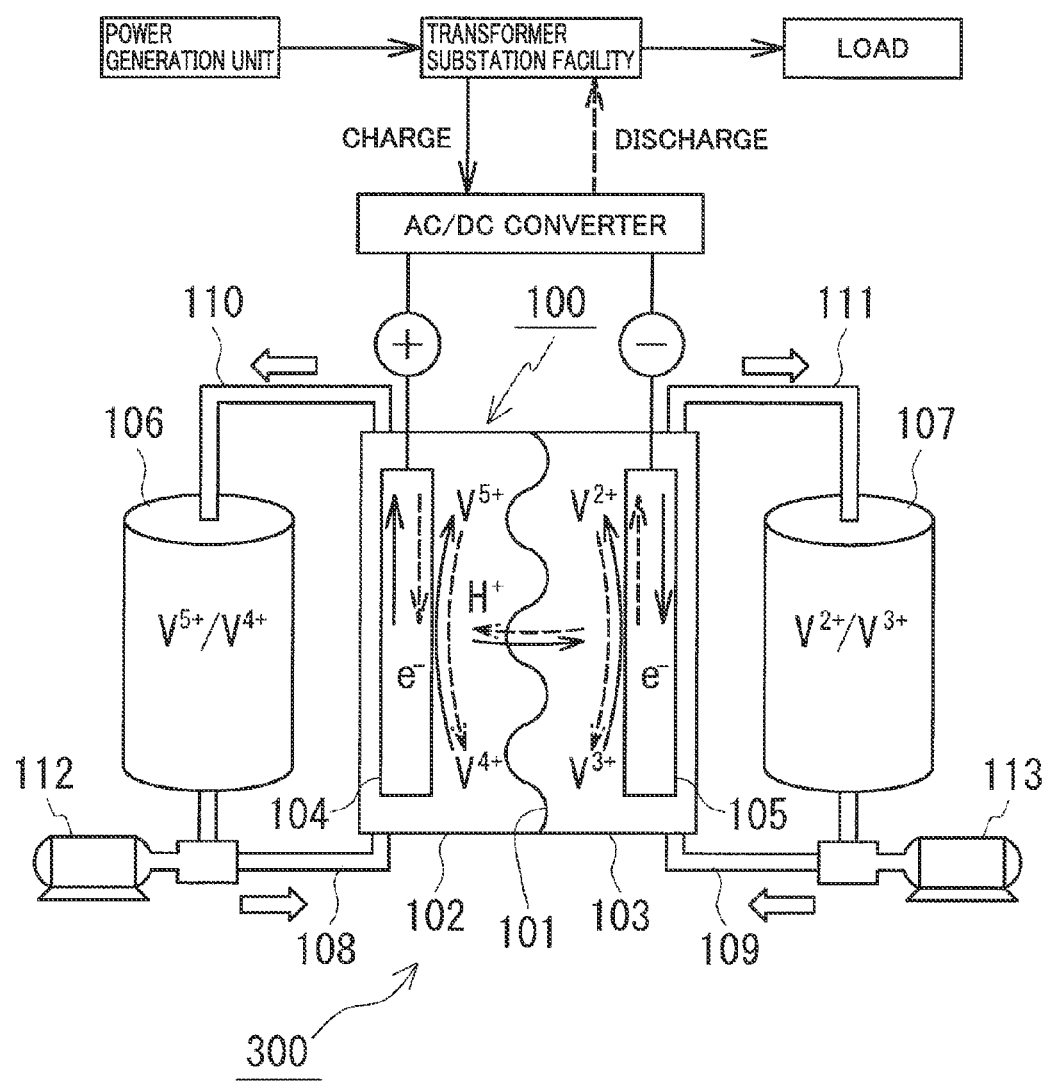
FIG. 10 shows a principle of operation of a redox flow battery.

Furthermore, width narrowing portion may not be a single width narrowing portion, and a plurality of width narrowing portions 310 may be provided. For example, as shown in FIG. 9, there is indicated an aspect which has width narrowing portion 310 on the side of opening portion 33 and the side of bottom wall 32. In that case, sidewall 31 (an inclined surface) in each width narrowing portion 310 may have an equal or different inclination angle.

Hereinafter will be described a redox flow battery including a cell frame according to the embodiments described above. When the cell frame is applied to the redox flow battery, it is utilized in a form of a cell stack formed such that it is composed of a cell frame, a positive electrode, an ion exchange membrane, and a negative electrode, each stacked in a plurality of layers (see FIG. 11). And a configuration is referred to in which the redox flow battery includes this cell stack.

INDUSTRIAL APPLICABILITY

The frame body and cell frame of the present invention are suitably applicable to a component of a redox flow battery.

REFERENCE SIGNS LIST

100: cell
101: ion exchange membrane
102: positive electrode cell; 104: positive electrode
103: negative electrode cell; 105: negative electrode
106: tank for positive electrode electrolyte
108, 110: conduit; 112: pump
107: tank for negative electrode electrolyte
109, 111: conduit; 113: pump
20: cell frame
21: bipolar plate; 22: frame body
22L: long piece; 22S: short piece; 22o: opening
24: chamber
200: manifold
201, 202: liquid supply manifold
203, 204: liquid drainage manifold
210: slit
211, 212: liquid supply slit
213, 214: liquid drainage slit
31: sidewall; 310: width narrowing portion
32: bottom wall
33: opening portion; 34: corner
40: protective plate
50: seal member
10S: cell stack
250: end plate
300: redox flow battery (RF battery)

The invention claimed is:

1. A device for a cell of a redox flow battery, the device comprising:
a frame body; and
a protective plate,
the frame body comprising:
an opening formed inside the frame body, the opening extending in a stacking direction of the cell frame;
a manifold through which an electrolyte circulates; and
a slit connected between the opening and the manifold, the slit forming a channel for the electrolyte between the opening and the manifold,
the slit having a pair of sidewalls which are oppositely disposed in a cross section orthogonal to a direction in which the electrolyte circulates, the slit having, in a portion along a depthwise direction of the slit, a bottom wall and a width narrowing portion at which a space between the sidewalls narrows along the depthwise direction of the slit,
wherein the depthwise direction of the slit is parallel to the stacking direction of the cell frame, and at least one of the sidewalls and the bottom wall form a corner having a curved surface, and
wherein the protective plate covers the slit.

2. The device according to claim 1, wherein:
the bottom wall has a flat surface parallel to a surface of the frame body.

3. The device according to claim 2, wherein at least one of the sidewalls and the bottom wall form an angle of 91 degrees or more and 120 degrees or less.

4. The device according to claim 1, wherein in the width narrowing portion, at least one of the sidewalls has an inclined surface which inclines relative to the depthwise direction, and the inclined surface is a flat surface.

5. A device for a cell of a redox flow battery, the device comprising:
a frame body; and
a protective plate,
the frame body comprising:
an opening formed inside the frame body, the opening extending in a stacking direction of the cell frame;
a manifold through which an electrolyte circulates; and
a slit connected between the opening and the manifold, the slit forming a channel for the electrolyte between the opening and the manifold,
the slit having a pair of sidewalls which are oppositely disposed in a cross section orthogonal to a direction in which the electrolyte circulates, the slit having, in a portion along a depthwise direction of the slit, a bottom wall and a width narrowing portion at which a space between the sidewalls narrows along the depthwise direction of the slit,
wherein the depthwise direction of the slit is parallel to the stacking direction of the cell frame, and in the width narrowing portion, at least one of the sidewalls has an inclined surface which inclines relative to the depthwise direction, and the inclined surface is a curved surface, and
wherein the protective plate covers the slit.

6. A device for a cell of a redox flow battery, the device comprising:
a frame body; and
a protective plate,
the frame body comprising:
an opening formed inside the frame body, the opening extending in a stacking direction of the cell frame;
a manifold through which an electrolyte circulates; and
a slit connected between the opening and the manifold, the slit forming a channel for the electrolyte between the opening and the manifold,
the slit having a pair of sidewalls which are oppositely disposed in a cross section orthogonal to a direction in which the electrolyte circulates, the slit having, in a portion along a depthwise direction of the slit, a bottom wall and a width narrowing portion at which a space between the sidewalls narrows along the depthwise direction of the slit,
wherein the depthwise direction of the slit is parallel to the stacking direction of the cell frame, and the bottom wall has a curved surface projecting in the depthwise direction of the slit, and
wherein the protective plate covers the slit.

7. The device according to claim 6, wherein an overall surface of the sidewalls and the bottom wall is formed in a curved surface.

8. The device according to claim 1, wherein a spacing between the sidewalls at any position in the depthwise direction of the slit is equivalent to or less than a spacing between the sidewalls closer to an opening portion's side than that position.

9. A cell frame for a redox flow battery, comprising:
the device according to claim 1; and
a bipolar plate fitted in the opening of the frame body, the frame body and the bipolar plate forming a chamber inside the frame body.

10. A redox flow battery comprising a cell frame for a redox flow battery according to claim 9.

* * * * *